United States Patent
Mehlen et al.

(10) Patent No.: US 9,550,579 B2
(45) Date of Patent: Jan. 24, 2017

(54) METHOD OF ESTIMATION OF THE SPEED OF AN AIRCRAFT RELATIVE TO THE SURROUNDING AIR, AND ASSOCIATED SYSTEM

(71) Applicant: Thales, Courbevoie (FR)

(72) Inventors: Christian Mehlen, Etoile sur Rhone (FR); Jacques Coatantiec, Montelier (FR)

(73) Assignee: Thales, Courbevoie (FR)

( * ) Notice: Subject to any disclaimer, the term of this patent is extended or adjusted under 35 U.S.C. 154(b) by 312 days.

(21) Appl. No.: 14/797,007

(22) Filed: Jul. 10, 2015

(65) Prior Publication Data

US 2016/0325844 A1   Nov. 10, 2016

(30) Foreign Application Priority Data

Jul. 18, 2014   (FR) ...................... 14 01619

(51) Int. Cl.
  *B64D 43/02*   (2006.01)
  *G01P 5/16*    (2006.01)
  *G01P 13/02*   (2006.01)
  *G01P 21/02*   (2006.01)
  (Continued)

(52) U.S. Cl.
  CPC .......... *B64D 43/02* (2013.01); *G01P 5/14* (2013.01); *G01P 5/16* (2013.01); *G01P 13/02* (2013.01); *G01P 13/025* (2013.01); *G01P 21/02* (2013.01); *G01S 19/13* (2013.01)

(58) Field of Classification Search
  CPC ............ B64D 43/02; G01S 19/13; G01P 5/16; G01P 13/02; G01P 21/02; G01P 5/14; G01P 13/025
  See application file for complete search history.

(56) References Cited

U.S. PATENT DOCUMENTS

| | | | |
|---|---|---|---|
| 3,945,593 A * | 3/1976 | Schanzer | G05D 1/0638 244/181 |
| 2008/0066540 A1 | 3/2008 | Childers | |
| 2010/0100260 A1 | 4/2010 | McIntyre | |

(Continued)

FOREIGN PATENT DOCUMENTS

EP   2 568 295 A1   3/2013

OTHER PUBLICATIONS

Freeman, P., et al., "Air Data System Fault Modeling and Detection," Control Engineering Practice 21:1290-1301, 2013.

(Continued)

*Primary Examiner* — Richard Camby
(74) *Attorney, Agent, or Firm* — Michael J. Donohue; Davis Wright Tremaine LLP (57) ABSTRACT

Method of estimation of the speed of an aircraft relative to the surrounding air, in a reference frame tied to the aircraft estimates an estimated static pressure on the basis of measurements of geographical altitude. The process then estimates a first intermediate variation of the speed of the aircraft relative to the surrounding air using explicitly the fact that the pressure measured by the static probe is falsified by a known quantity under the effect of the speed of the aircraft relative to the surrounding air. Finally, temporal integration of the first intermediate variation of the speed of the aircraft relative to the surrounding air provides an estimated speed of the aircraft relative to the surrounding air.

18 Claims, 2 Drawing Sheets

(51) Int. Cl.
  *G01P 5/14* (2006.01)
  *G01S 19/13* (2010.01)

(56) References Cited

U.S. PATENT DOCUMENTS

2013/0066488 A1    3/2013  Walter

OTHER PUBLICATIONS

McGraw, G.A., et al., "Synthetic Pressure Altitude: An Alternative Means to Achieve Reduced Vertical Separation Minima Aviation Altimetry," ION 59th Annual Meeting / CIGTF 22nd Guidance Test Symposium, Jun. 23-25, 2003, Albuquerque, New Mexico, pp. 308-316.
French Search Report mailed Mar. 25, 2015, in French Patent Application No. 1401619, filed Jul. 18, 2014, 9 pages.
Deckert, J.C., et al., "F-8 DFBW Sensor Failure Identification Using Analytic Redundancy," IEEE Transactions on Automatic Control 22(5):795-803, Oct. 1977.

\* cited by examiner

METHOD OF ESTIMATION OF THE SPEED OF AN AIRCRAFT RELATIVE TO THE SURROUNDING AIR, AND ASSOCIATED SYSTEM

TECHNICAL FIELD

The present invention pertains to a method of estimation of the speed of an aircraft relative to the surrounding air, in a reference frame tied to the aircraft.

BACKGROUND OF THE INVENTION

The piloting and guidance of an aircraft requires, among other information, knowledge of the speed vector of the aircraft relative to the surrounding air, and knowledge of the barometric altitude.

This knowledge of the speed vector of the aircraft relative to the air is obtained on the basis of a set of probes which provide local measurements of pressure, of orientation of the air stream and of the temperature of the environment air, and which constitute input parameters for determining the speed vector of the aircraft relative to the air and the barometric altitude. This determination implements local aerodynamic corrections (SSEC laws, the acronym standing for "Static Source Error Correction"), which convey the matrix coupling between the local measurements and the true values of the speed vector of the aircraft relative to the surrounding air, and of the barometric altitude.

The speed vector of an aircraft relative to the surrounding air is usually expressed in spherical coordinates in a trihedron or reference frame tied to the aircraft, in the form of three components: the speed TAS of the aircraft relative to the surrounding air, the angle of attack AOA of the aircraft and the angle of sideslip SSA of the aircraft. It can also be expressed in Cartesian coordinates in the reference frame tied to the aircraft, in the form of the three components: VXair, VYair, VZair.

The operating safety of the aircraft requires that the knowledge of the speed vector of the aeroplane relative to the air and the knowledge of the barometric altitude have a sufficient level of reliability and availability.

Usually an aircraft is furnished with several suites of probes which offer physical redundancy. A device for monitoring failures is implemented so that this redundancy is handled in the best way.

Failure detection based on hardware redundancy of sensors of the same design does not make it possible to detect common-mode faults, i.e. a phenomenon capable of simultaneously affecting the proper operation of several sensors. If a fault mode can affect at least half the sensors, then the isolation of the failed sensors is no longer possible. The use of several sensors having dissimilar operating principles makes it possible to reduce the risk of common mode, at the price of increased complexity.

An alternative to physical redundancy is analytical redundancy, which consists in performing an estimation of the value of the parameter measured by a sensor, which is not impacted (or impacted as little as possible) by the failure of the actual sensor.

The estimation of the value of the parameter implements either the expression of a kinematic coupling with other sources of measurements (usually inertial measurements), or the expression of constraints of dynamic change based on flight mechanics, or on a combination of the two schemes (kinematic and dynamic).

The use of a redundancy between a sensor measurement and an estimation has diverse drawbacks.

An observer or estimator of speed of an aircraft relative to the surrounding air, constructed by kinematic coupling with the inertial measurements, can with difficulty eliminate the acceleration of the air relative to the ground. Consequently, such an observer cannot discern a failure of the sensor leading to an error in the speed of the aircraft relative to the surrounding air that is lower than the amplitude of the speed of the surrounding air relative to the ground that would be developed by a strong gust of wind.

An observer or estimator of speed of an aircraft relative to the surrounding air based on flight mechanics requires the knowledge of certain characteristic data of the aircraft (aerodynamic coefficients, mass, moments of inertia, thrust of the engines). Access to this information is not easy. It is possible to identify it in flight (by estimation techniques, explicitly or implicitly) but this operation generally turns out to be tricky.

The basic problem is the stabilization of the estimator so that the estimated measurement provides a faithful replica of reality, without directly using the measurement of the actual sensor, for fear that in case of failure of the sensor, the measurements provided by other sensors (presumed to be reliable) may not stabilize.

The estimator of the speed of an aircraft relative to the surrounding air, with kinematic coupling, with inertial measurements (cf J. C. Deckert et al, 1976, "F-8 aircraft sensor failure identification using analytical redundancy", IEEE) operates in open-loop and its performance is limited by the uncertainty in the acceleration of the air relative to the ground. To avoid a crippling rate of false alarms (failure detection with each gust of wind), the estimator must be adjusted in a slack manner, thereby prohibiting it from detecting a failure of the sensor leading to an error in the speed of the aircraft relative to the surrounding air that is lower than the amplitude of the speed of the air relative to the ground that would be caused by a strong gust of wind.

The prior art therefore tends to favour observers with dynamic coupling, on principle less sensitive to the motion of the air relative to the ground. The problem is then to ascertain with sufficient accuracy the characteristic data of the aircraft (aerodynamic coefficients, moments of inertia, thrust of the engines, mass) which come into the motion propagation equations.

Diverse techniques (explicit estimation of Kalman filtering type) are known which consist in estimating these data during learning flight phases, by using supposedly reliable sensors and by counting on trajectories offering the required observability. These techniques induce heavy operational constraints.

Other techniques (implicit estimation, such as PCA, the acronym standing for "Principal Component Analysis", SMI the acronym standing for "Subspace Model Identification", or OKID the acronym standing for "Observer Kalman Identifier") are also known which consist in estimating a representation of these data (and not the data directly), on-line over a longer or shorter time horizon relative to the current instant. In this case the formal validation of the performance of the observer is difficult since the analytical tie with the physics of the problem, which would have made it possible to reduce a priori the quantity of test cases to be passed in order to demonstrate the missing detection and false alarm rates, is lost.

An aim of the invention is to alleviate these problems.

SUMMARY OF THE INVENTION

There is proposed, according to an aspect of the invention, a method of estimation of the speed of an aircraft relative to the surrounding air, in a reference frame tied to the aircraft, comprising:

a first step consisting in estimating a static pressure estimated on the basis of measurements of the geographical vertical speed of the aircraft, of measurements of the temperature of the surrounding air, of reinitializations of the estimated static pressure, and of a feedback of the said estimated static pressure, by integration over a vertical path of a hydrostatic equation;

a second step consisting in estimating a first intermediate variation of the speed of the aircraft relative to the surrounding air on the basis:

of a deviation between a variation of an estimated static pressure and a variation of a measured static pressure;

of an angle of attack of the aircraft and of an angle of sideslip of the aircraft;

of a linear combination of a variation of the speed of the aircraft relative to the surrounding air, of a variation of the angle of attack of the aircraft, and of a variation of the angle of sideslip of the aircraft, whose coefficients depend on laws of local aerodynamic correction dependent on the aircraft, on the speed of the aircraft relative to the surrounding air, on the angle of attack of the aircraft, and on the angle of sideslip of the aircraft, and a third step of temporal integration of the said first intermediate variation of the speed of the aircraft relative to the surrounding air using reinitializations of the estimated speed of the aircraft relative to the surrounding air to deliver at output an estimated speed of the aircraft relative to the surrounding air.

Such a method makes it possible to obtain an estimation of the speed of an aircraft relative to the surrounding air without using the sensors measuring this speed. It explicitly uses the fact that the pressure measured by the static probe is falsified (by a known quantity) under the effect of the speed of the aircraft relative to the surrounding air.

This method therefore provides an element of analytical redundancy which can advantageously be used for the operating safety of the aircraft.

According to one mode of implementation, the said second step also estimates a first indicator of quality of the said first intermediate variation of the speed of the aircraft relative to the surrounding air dependent on the said coefficients of the said linear combination.

The presence of an indicator of quality allows notably the user to dynamically manage the anomaly detection threshold when the previously estimated speed is used in a device for monitoring a sensor measuring the speed of the aircraft.

In a mode of implementation, the method furthermore comprises:

a fourth step consisting in estimating a second intermediate variation of the speed of the aircraft relative to the surrounding air on the basis of inertial measurements and of a feedback of the estimated speed of the aircraft relative to the surrounding air at output, by likening the speed vector of the aircraft relative to the surrounding air to a speed vector of the aircraft relative to an inertial reference frame obtained by integration of the components of a measured acceleration vector (Inertial measurements), corrected for the kinematic effect of the reference frame tied to the aircraft and increased by the gravity projected into the reference frame tied to the aircraft, and consisting in estimating a second indicator of quality of the said second intermediate variation of the speed of the aircraft relative to the surrounding air; and a fifth step of fusing the said second intermediate variation of the speed of the aircraft relative to the surrounding air with the said first intermediate variation of the speed of the aircraft relative to the surrounding air by filtering of barycentre type weighted by the said first and second indicators of quality or by a filtering of Kalman type, and of fusion of the said first and second indicators of quality in an indicator of quality fused on the basis of the error variance estimated by the said filtering.

Thus, the fusion makes it possible to combine two estimations of the speed of the aircraft each marred by independent errors: one is affected by the motion of the isobar, the other is affected by wind turbulence. The result is a reduction in the error of the speed of the aircraft after fusion.

According to one mode of implementation, the said reinitializations of the estimated static pressure of the first step use measurements of the static pressure that are corrected by the laws of local aerodynamic correction.

These reinitializations of the estimated static pressure allow a long-term stabilization of the estimated static pressure, which is necessary to temper the natural divergence related to the integration effect, to the geographical speed measurement errors, and to the effect of the motion of the isobar.

In a mode of implementation, the said reinitializations of the estimated speed of the aircraft relative to the surrounding air use measurements of the speed of the aircraft relative to the surrounding air that are corrected by the laws of local aerodynamic correction.

These reinitializations of the estimated speed of the aircraft relative to the surrounding air allow a long-term stabilization of the estimated TAS, which is necessary to temper the natural divergence related to the integration effect, and to the effect of the imperfection of the coefficients of the linear combination.

The proposed method is based on an estimation with kinematic coupling, but offering much better tolerance to the motion of the air relative to the ground by virtue of the introduction of the static pressure measurement.

The following advantages are thus combined:

advantage of analytical redundancy (relative to physical redundancy): possibility of handling the common modes of failure, and lesser complexity;

advantage of estimation by kinematic coupling (relative to dynamic coupling): no need to know the characteristic data of the aircraft;

advantage of estimation by dynamic coupling (relative to kinematic coupling): lesser sensitivity to wind motion relative to the ground.

According to another aspect of the invention, there is also proposed a system for estimating the speed of an aircraft relative to the surrounding air, in a reference frame tied to the aircraft, adapted for implementing the method such as described above.

According to another aspect of the invention, there is also proposed an aircraft comprising a system such as described above.

The invention will be better understood on studying a few embodiments described by way of wholly non-limiting examples and illustrated by the appended drawings in which:

In all the figures, elements having identical labels are similar.

Figure 1:
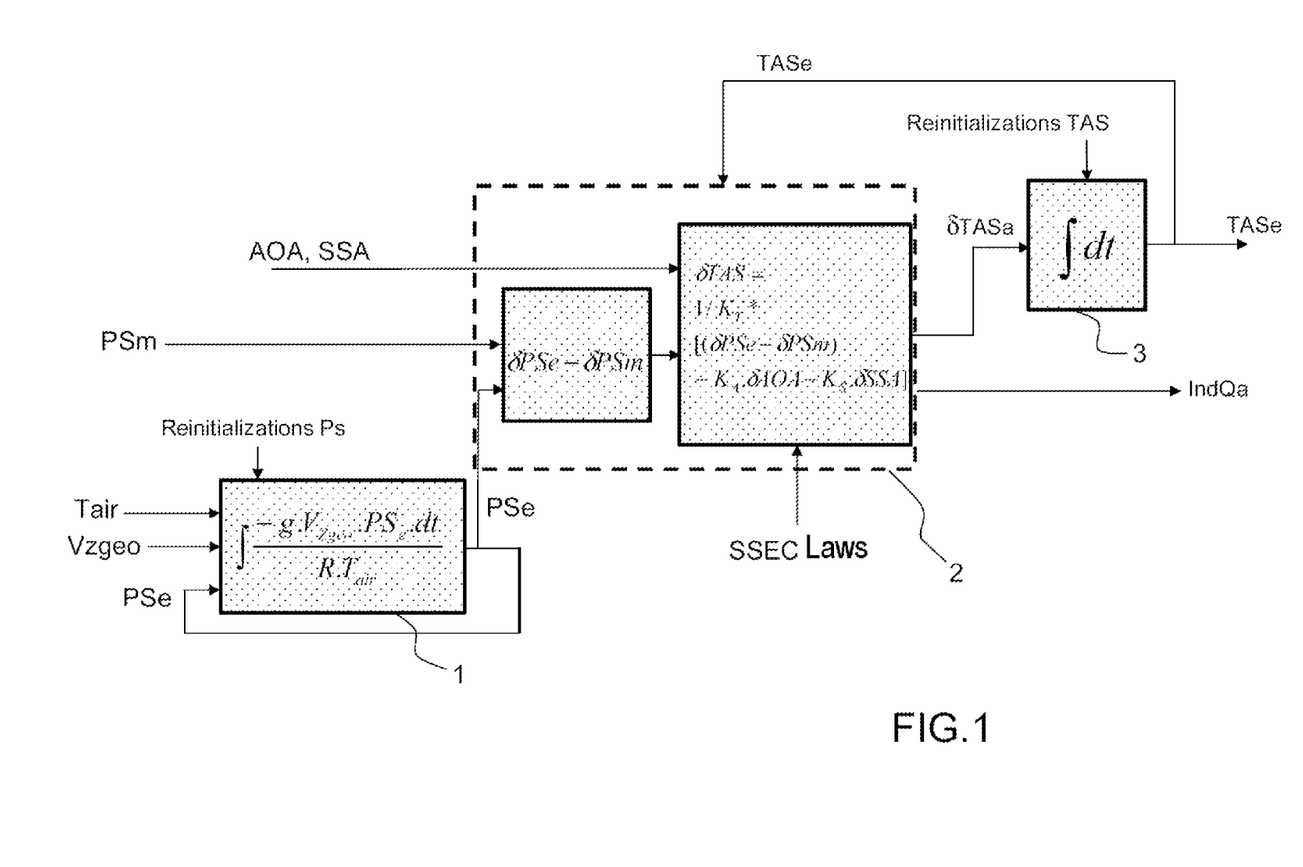
FIGS. 1 and 2 schematically illustrate a method according to an aspect of the invention.

FIG. 1 schematically illustrates a method of estimating the speed TASe of an aircraft relative to the surrounding air, in a reference frame tied to the aircraft according to an aspect of the invention.

Figure 2:
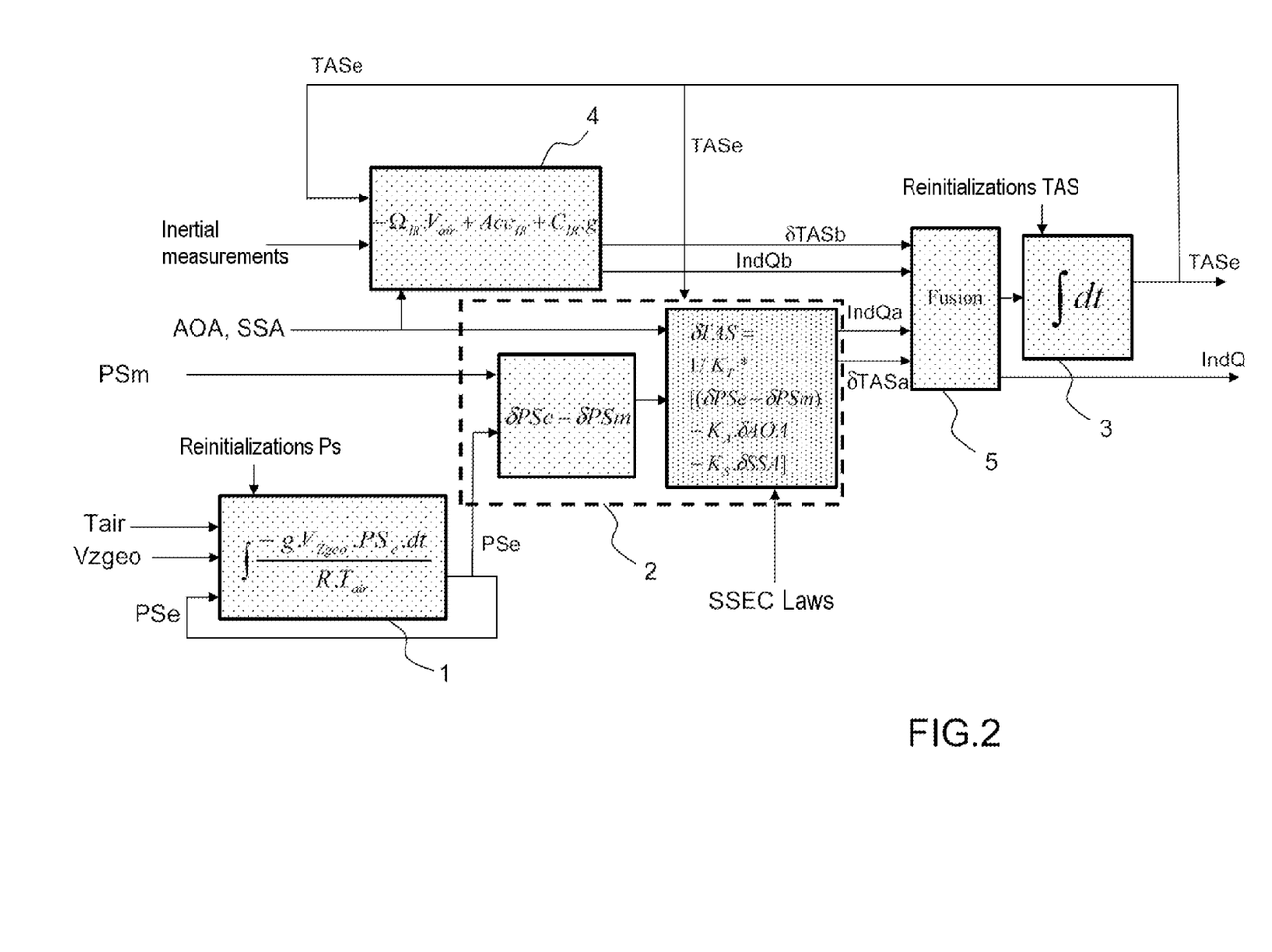

FIG. 2 illustrate a further improvement to the method of FIG. 1.

DETAILED DESCRIPTION OF THE INVENTION

The method of estimation of the speed of an aircraft relative to the surrounding air, in a reference frame tied to the aircraft, comprises:
- a first step 1 consisting in estimating an estimated static pressure PSe on the basis of measurements of the geographical vertical speed Vzgeo of the aircraft, of measurements of the temperature Tair of the surrounding air, of reinitializations of the estimated static pressure PSe, and of a feedback of the said estimated static pressure PSe, by integration over a vertical path of a hydrostatic equation;
- a second step 2 consisting in estimating a first intermediate variation δTASa of the speed of the aircraft relative to the surrounding air on the basis:
  - of a deviation between a variation δPSe of the estimated static pressure and a variation δPSm of the measured static pressure;
  - of an angle of attack of the aircraft AOA, and of an angle of sideslip of the aircraft SSA;
  - of a linear combination of a variation δTAS of the speed of the aircraft relative to the surrounding air, of a variation δAOA of the angle of attack of the aircraft, and of a variation δSSA of the angle of sideslip of the aircraft, whose coefficients depend on local aerodynamic SSEC corrections dependent on the aircraft, of the speed TASe of the aircraft relative to the surrounding air, of the angle of attack of the aircraft AOA, and of the angle of sideslip of the aircraft SSA; and
- a third step 3 of temporal integration of the said first intermediate variation δTASa of the speed of the aircraft relative to the surrounding air using reinitializations of the estimated speed of the aircraft relative to the surrounding air to deliver at output an estimated speed TASe of the aircraft relative to the surrounding air.

The first step 1 consisting in estimating an estimated static pressure PSe can be carried out as follows.

The static pressure at a given point is obtained by integrating (along the vertical path) the conventional hydrostatic equation:

$$dPS_e = -\rho \cdot g \cdot dz_{geo} = -\frac{PS_e}{RT_{air}} \cdot g \cdot dz_{geo}$$

-continued $$dPS_e = -\frac{g}{R} \cdot \frac{PS_e}{T_{air}} \cdot dz_{geo}$$

with R the air constant (R=287 m²/K·s²), and $z_{geo}$ the geographical altitude.

Integration of the differential equation requires an initial value of the pressure and a knowledge of the temperature along the vertical path. The baro-standard altitude (ISA, the acronym standing for "International Standard Atmosphere") is thus based on a "mean" model of the temperature (15° C. at sea level, and then linear decrease to 6.5° C./km). The fact that the actual temperature at sea level is different from 15° C. and that the vertical temperature gradient below the current point is not strictly constant=6.5° C./km will lead to a different static pressure ISA from the actual static pressure.

The equation hereinabove is merely the first term of the general equation of change for $PS_e$:

$$dPS_e = \frac{\partial PS_e}{\partial z} \cdot dz + \frac{\partial PS_e}{\partial l} \cdot dl + \frac{\partial PS_e}{\partial t} \cdot dt$$

The second term of the sum conveys the variation of $PS_e$ along the horizontal (without changing altitude), the third conveys the temporal variation of $PS_e$ (while remaining at the same location).

By retaining the first term we thus obtain the equation of change for $PS_e$:

$$\dot{PS}_e = -\frac{1}{R \cdot T} \cdot g \cdot V_{zgeo} \cdot PS_e + \xi_P \qquad (eq\ 1)$$

The term $\xi_P$ corresponds to the disturbance of the atmosphere that cannot easily be modelled (terms in dl and dt).

The magnitude $V_{zgeo}$ is the geographical speed measured by an inertial system or a GPS receiver. The temperature Tair is the air temperature measured by a temperature probe.

The formulation for the open-loop observer of Ps is thus obtained:

$$PS_e(t_n) = PS_e(t_{n-1}) \cdot \left[1 - (t_n - t_{n-1}) \cdot \frac{g}{R} \cdot \frac{V_{zgeo}(t_{n-1})}{T_{air}(t_{n-1})}\right]. \qquad (eq\ 2)$$

In practice, the summary measurement provided by this open-loop observer will tend to stray from the actual values on account 1) of the errors in geographical speed measurement and in air temperature, and 2) of the disturbances of the atmosphere (variation of the isobar relative to geographical altitude).

The first step 1 also uses reinitializations of the estimated static pressure PSe for example by periodic reinitializations by means of the static pressure arising from the static pressure measurement rig (raw static pressure measured and corrected by the SSEC laws) or by setting up an exterior loop which uses this same measured and corrected static pressure to construct a slow correction.

The second step 2 consisting in estimating a first intermediate variation δTASa of the speed of the aircraft relative to the surrounding air can be carried out as follows.

The static pressure is the sum of the pressure PSm measured by the static probe and of the SSEC correction for the effect of the speed (impact of the mach, of the angle of attack of the aircraft AOA, and of the angle of sideslip of the aircraft SSA).

We write that the speed of variation of the static pressure is the sum of the speed of variation of the pressure PSm and of the speed of the SSEC correction:

$$\frac{dPS_e}{dt} = \frac{-g \cdot V_{Zgeo} \cdot PS_e}{R \cdot T} = \frac{dPS_m}{dt} + \frac{dCor}{dt} =$$

$$\frac{dP_m}{dt} + \frac{\partial Cor}{\partial M} \cdot \frac{dM}{dt} + \frac{\partial Cor}{\partial AOA} \cdot \frac{dAOA}{dt} + \frac{\partial Cor}{\partial SSA} \cdot \frac{dSSA}{dt}$$

With:
Cor representing the SSEC correction to be applied to the measured static pressure to obtain the true static pressure, in Pascals;
M representing the Mach, dimensionless
A summary measurement of the variation of a linear combination of M, AOA, SSA is thus obtained:

$$K_M \cdot \delta M + K_A \cdot \delta AOA + K_S \cdot \delta SSA = \frac{-g \cdot V_{Zgeo} \cdot PS_e \cdot \delta t}{R \cdot T_{air}} - \delta P_m \quad \text{(eq 3)}$$

$$\text{by writing } \frac{\partial Cor}{\partial M} = K_M \quad \frac{\partial Cor}{\partial AOA} = K_A \quad \frac{\partial Cor}{\partial SSA} = K_S.$$

The coefficients $K_M$, $K_A$, $K_S$, which constitute the coefficients of the linear combination, are calculated on the basis of the aircraft's SSEC correction laws, at the current point of the flight domain.

Moreover, as the speed of an aircraft relative to the surrounding air TAS is related to the Mach by TAS= $\sqrt{\gamma \cdot R \cdot T_{air}} \cdot M$ (denoting by $\gamma$ the ratio of the specific heats of air at constant volume and pressure, by R the ideal gas constant, and by $T_{air}$ the temperature of the air) it is possible to reformulate equation 3 by introducing the TAS rather than the Mach M:

$$K_T \cdot \delta TAS + K_A \cdot \delta AOA + K_S \cdot \delta SSA = \quad \text{(eq 4)}$$

$$\frac{-g \cdot V_{Zgeo} \cdot PS_e \cdot \delta t}{R \cdot T} - \delta PS_m = \delta PS_e - \delta PS_m$$

with $K_T = K_M / \sqrt{\gamma \cdot R \cdot T_{air}}$

If moreover the angles of attack AOA and of sideslip SSA are known, equation 4 above becomes:

$$\cdot \delta TAS = \frac{1}{K_T}(\delta PS_e - \delta PS_m - K_A \cdot \delta AOA - K_S \cdot \delta SSA) \quad \text{(eq 4')}$$

An estimation is thus obtained of the variation of the speed of the aircraft relative to the surrounding air TAS, the quality of which depends on the amplitude of the coefficient $K_T$.

These coefficients $K_T$, $K_A$, $K_S$ are calculated on the basis of the SSEC correction laws, which themselves depend on the topology of mounting of the probes on the aircraft and on the current point of the flight domain. When the SSEC corrections are known in the form of polynomials, the calculation of the coefficients consists of a simple derivation. When the corrections are known in tabulation form, they should be reformulated in polynomial form by applying a fitting scheme.

The quality of the estimation is all the more effective the larger the coefficient $K_T$, that is to say the more the mounting topology is such that the speed vector $V_{air}$ of the aircraft relative to the surrounding air significantly falsifies the measurement PSm produced by the static probe.

The accuracy with which it is necessary to know the angles of attack of the aircraft AOA and of sideslip of the aircraft SSA depends on the amplitude of the coefficients $K_A$, and $K_S$. When the latter are small, the angles of attack AOA and/or of sideslip SSA can be neglected in equation 4 or 4' hereinabove.

The second step 2 also estimates the first indicator of quality IndQa of the said first intermediate variation δTASa of the speed of the aircraft relative to the surrounding air dependent on the said coefficients of the said linear combination, on the accuracy of the measurements involved in the calculation of a variation of the speed of the aircraft relative to the surrounding air δTASa (geographical vertical speed Vzgeo, air temperature Tair, and optionally angle of attack of the aircraft AOA and angle of sideslip of the aircraft SSA), and on the standard deviation of the speed of variation of the isobar, itself dependent on the horizontal and vertical speeds of the aircraft according to a modelling well known to the person skilled in the art.

Thereafter, during the third step 3, a temporal integration of the first intermediate variation δTASa of the speed of the aircraft relative to the surrounding air makes it possible to deliver at output an estimated speed TASe of the aircraft relative to the surrounding air.

This estimated speed TASe of the aircraft relative to the surrounding air can be reused in the second step 2 to intervene in the calculation of the coefficients $K_T$, $K_A$, and $K_S$ since they depend on the current point of the flight domain.

The third step 3 also uses reinitializations of the estimated speed of the aircraft relative to the surrounding air, for example by periodic reinitializations by means of actual measurements or by setting up an exterior loop which uses the actual measurements to construct a slow correction (slow relative to the fast correction arising from the static pressure estimator). The actual measurements mentioned are those arising from the rig for actual measurements of the speed of the aircraft relative to the surrounding air after correction by the laws of local aerodynamic correction SSEC.

In FIG. 2 is represented an improvement of the method of FIG. 1, comprising, furthermore:

a fourth step 4 consisting in estimating a second intermediate variation δTASb of the speed of the aircraft relative to the surrounding air on the basis of inertial measurements and of a feedback of the estimated speed TAS of the aircraft relative to the surrounding air at output, by likening the speed vector of the aircraft relative to the surrounding air to a speed vector of the aircraft relative to an inertial reference frame obtained by integration of the components of a measured acceleration vector (Inertial measurements), corrected for the kinematic effect of the reference frame tied to the aircraft and increased by the gravity projected into the reference frame tied to the aircraft, and consisting in estimating a second indicator of quality of the said second intermediate variation of the speed of the aircraft relative to the surrounding air; and a fifth step 5 of fusion of the said second intermediate variation δTASb of the speed of the aircraft relative to the surrounding air with the said first intermediate variation δTASa of the speed of the aircraft relative to the surrounding air by filtering of barycentre type weighted by the said first and second indicators of quality IndQa, IndQb or by a filtering of Kalman type, and of fusion of the said first and second indicators of quality IndQa, IndQb into a fused indicator of quality IndQ on the basis of the error variance estimated by the said filtering.

The fourth step 4 of estimating a second intermediate variation δTASb of the speed of the aircraft relative to the surrounding air can be carried out as follows.

The vector Vair of speed of the aircraft relative to the surrounding air can be expressed either in the form of three Cartesian coordinates Vxair, Vyair, and Vzair in the reference frame tied to the aircraft, or in the form of three spherical coordinates TAS, AOA, SSA in the reference frame tied to the aircraft.

A conversion from spherical coordinates to Cartesian coordinates is then performed at the start of the fourth step 4 and conversion from Cartesian coordinates to spherical coordinates at the end of the fourth step 4.

The relation which links these two forms of representation is as follows:

$$V_{air} = \begin{bmatrix} Vx_{air} \\ Vy_{air} \\ Vz_{air} \end{bmatrix} = \begin{bmatrix} TAS \cdot \cos AOA \cdot \cos SSA \\ TAS \cdot \sin SSA \\ TAS \cdot \sin AOA \cdot \cos SSA \end{bmatrix} \quad \text{(eq 5)}$$

The speed TAS of the aircraft relative to the surrounding air is thus related to the three Cartesian components of the vector Vair of speed of the aircraft relative to the surrounding air by the following relation:

$$TAS^2 = Vx_{air}^2 + Vy_{air}^2 + Vz_{air}^2$$

By differentiating this equation we obtain the relation which links the derivative of speed TAS of the aircraft relative to the surrounding air and the derivative of the three Cartesian components of the speed vector Vair of the aircraft relative to the surrounding air:

$$TAS \cdot \dot{T}AS = Vx_{air} \cdot \dot{V}x_{air} + Vy_{air} \cdot \dot{V}y_{air} + Vz_{air} \cdot \dot{V}z_{air}$$

From this is deduced an equation for the propagation of the speed TAS of the aircraft relative to the surrounding air:

$$\dot{T}AS = \frac{1}{TAS} \cdot (Vx_{air} \cdot \dot{V}x_{air} + Vy_{air} \cdot \dot{V}y_{air} + Vz_{air} \cdot \dot{V}z_{air}) \quad \text{(eq 6)}$$

The equation of propagation of the inertial speed vector of the aircraft expressed in the reference frame tied to the aircraft is now considered. The derivative of this vector with respect to time is equal to the acceleration measured by the accelerometers, corrected for the kinematic effect of the reference frame tied to the aircraft and increased by the gravity projected into the reference frame tied to the aircraft:

$$\dot{V}_I = \Omega_{IR} \cdot V_I + Acc_{IR} + C_{IR} \cdot g$$

in which $Acc_{IR}$ represents the inertial acceleration vector, $\Omega_{IR}$ represents the matrix of the pqr values (the three components of the inertial rotation speed vector), and $C_{IR}$ represents the coefficients of projection of the vertical in the reference frame tied to the aircraft:

$$\Omega_{IR} = \begin{bmatrix} 0 & -r & q \\ r & 0 & -p \\ -q & p & 0 \end{bmatrix} \quad C_{IR} = \begin{bmatrix} -\sin\theta \\ \cos\theta \cdot \sin\varphi \\ \cos\theta \cdot \cos\varphi \end{bmatrix}$$

denoting the roll by θ and the pitch by φ.

By neglecting the acceleration of the wind, this same equation is used for the speed of the aircraft relative to the air:

$$\dot{V}_{air} \approx -\Omega_{IR} \cdot V_{air} + Acc_{IR} + C_{IR} \cdot g \quad \text{(eq 7)}$$

$$\text{with } V_{air} = \begin{bmatrix} Vx_{air} \\ Vy_{air} \\ Vz_{air} \end{bmatrix} \text{ and } \dot{V}_{air} = \begin{bmatrix} \dot{V}x_{air} \\ \dot{V}y_{air} \\ \dot{V}z_{air} \end{bmatrix}$$

By replacing in equation eq 6 the quantities $\dot{V}x_{air}$, $\dot{V}y_{air}$, $\dot{V}z_{air}$ by their equivalents given by the right-hand side of equation eq 7, and then by replacing in this new equation the quantities $Vx_{air}$, $Vy_{air}$, $Vz_{air}$ by their equivalents given by the right-hand side of equation eq 5, a first estimation of the derivative of the speed TAS of the aircraft relative to the surrounding air is thus obtained in the form:

$$\dot{T}AS = f(TAS, AOA, SSA, \Omega_{IR}, Acc_{IR}, C_{IR} \cdot g) \quad \text{(eq 8)}$$

The right-hand side depends on known parameters. It is also marred by an error, which is dimensionally equivalent to an acceleration error, and which represents the unknown acceleration of the wind and the effect induced by the inaccuracy of the inertial measurements and of the measurements of an angle of attack of the aircraft AOA, and of an angle of sideslip of the aircraft SSA.

Moreover the method using the measurements of static pressure and the coefficients of the SSEC laws provides another estimation of the derivative of the speed TAS of the aircraft relative to the surrounding air:

$$\dot{T}AS = \frac{1}{K_T} \cdot \left( \frac{-g \cdot V_{Zgeo} \cdot PSe}{R \cdot T_{air}} - \frac{\delta PS_m}{\delta t} - K_A \cdot \frac{\delta AOA}{\delta t} - K_S \cdot \frac{\delta SSA}{\delta t} \right)$$

The right-hand side is likewise marred by an error, which is dimensionally equivalent to an acceleration, and which contains the effect of the unknown speed of variation of the isobar (relative to the geographical altitude Zgeo) and the effect induced by the inaccuracy of the measurements of the geographical vertical speed Vzgeo, of the temperature Tair of the surrounding air, of the measured static pressure PSm, of the angle of attack AOA of the aircraft, and of the angle of sideslip SSA of the aircraft.

The fourth step 4 also estimates the second indicator of quality IndQb of the second intermediate variation δTASb of the speed of the aircraft relative to the surrounding air, which depends on the accuracy of the measurements involved in the calculation of the second intermediate variation δTASb (inertial measurements) and the standard deviation of the acceleration of the wind provided by a modelling well known to the person skilled in the art.

The fifth fusion step 5 can be performed by combining these independent sources of estimation of the variation δTASa δTASb of the speed of the aircraft relative to the surrounding air, into a fused variation of the speed of the aircraft relative to the surrounding air δTAS, for example by a weighted average, the weighting coefficients then being deduced from the error standard deviations $\sigma_a$ and $\sigma_b$ associated with each of the sources (steps 2 and 4):

$$\delta TAS = \frac{\sigma_b}{\sigma_a + \sigma_b} \cdot \delta TAS_a + \frac{\sigma_a}{\sigma_a + \sigma_b} \cdot \delta TAS_b$$

It is in this case the fused variation of the speed of the aircraft relative to the surrounding air δTAS which is temporally integrated by the third step 3.

Of course, as a variant, it is possible to perform the third step 3 of temporal integration before the fifth fusion step 5, in which case the fusion is performed on the estimation of the speed of the aircraft relative to the surrounding air and not its variations.

Likewise, other fusion techniques can be used to couple the two estimations, such as the Kalman filter.

The fusion of data originating from the inertia and of data originating from the static pressure significantly improves the accuracy of the estimation of the speed TAS of the aircraft relative to the surrounding air, and therefore of the speed vector $V_{air}$ of the aircraft relative to the surrounding air, but does not allow this estimation to be stabilized well over the long term. Indeed, the use of the static pressure measurement PSm directly improves the estimation of the acceleration of the aircraft relative to the air. The improvement of the estimation of the speed is only the consequence of the improvement of the estimation of the acceleration. The temporal integration of the acceleration to obtain the speed may therefore diverge over the long term.

Stabilization over the long term can be obtained by periodic reinitializations or by setting up an exterior loop as explained hereinabove in the details of the third step 3 by implementing well-known techniques of long-term stabilization.

With a periodic reinitialization, there exists a blind zone at the moment of the reinitialization: if the failure of the actual measurement rig (producing a measured speed of the aircraft relative to the surrounding air TASm) intervenes just before the moment of reinitialization, then the estimated TASe speed of the aircraft relative to the surrounding air TAS is falsified and does not make it possible to detect the failure. To counter this blind zone it is possible to use two distinct estimations, whose instants of reinitialization are temporally staggered (by half the reinitialization period).

The exterior loop is based on a correction calculated on the basis of the deviation between the estimated speed of the aircraft relative to the surrounding air TASe and the measured speed of the aircraft relative to the surrounding air TASm produced by the rig for actual measurement of the speed of the aircraft relative to the air. This correction is thereafter applied in the rig for producing the estimated speed of the aircraft relative to the surrounding air TASe to track in the long-term the measured speed of the aircraft relative to the surrounding air TASm. The correction is designed to stabilize the estimation of the estimated speed of the aircraft relative to the surrounding air TASe over the long term while guaranteeing a delay to the absorption of a failure of the measured speed of the aircraft relative to the surrounding air TASm. Thus, by comparing the estimated speed TASe and the measured speed TASm it is possible to detect a failure of the measured speed TASm on condition that this failure develops over a sufficiently short time.

The periodic reinitialization technique can thus be seen as a particular realization of the exterior loop technique: the correction therein is reduced to the sampled identity function (the correction is equal to the estimation).

In both cases, the estimation, coupled with the long-term stabilization, is characterized by its capacity to detect a failure of the rig for actual measurement of the speed of the aircraft relative to the surrounding air, this failure being characterized by a minimum amplitude $A_{MIN}$ and a maximum establishment time $T_{MAX}$. A failure whose amplitude is greater than $A_{MIN}$ and whose establishment time is less than $T_{MAX}$ is almost certainly detected. A failure of lower amplitude and/or of longer establishment time will probably be undetected.

The use of the "inertia/static pressure" fusion makes it possible to reduce $A_{MIN}$ and to increase $T_{MAX}$, thereby improving the capacity for detecting a failure in the rig for actual measurement of the speed of the aircraft relative to the surrounding air.

The use of estimations for the purposes of detecting and isolating sensor failures is well known from the prior art. It usually implements two groups of sensors A and B, these two groups being assumed to be independent in relation to failures: the occurrence of a failure in group A is independent of the occurrence of a failure in group B (or, at least, the risk of such a dependency is low).

The measurements provided by the sensors A are presumed to be reliable and used to calculate estimations Best, which are representative of the measurements produced by the sensors B. An analytical redundancy is thus obtained. By comparing the estimations Best and the actual measurements B, it is possible to detect a failure, and to isolate the failed sensor or sensors of the group B while ensuring continuity of operation.

As a function of the operational constraints, the comparison can be permanent (with an increased risk of false-alarm) or triggered upon an event (for example upon the detection of an incoherence between sensors of group B) with an increased risk of missed detection. The association of physical redundancy (measurement) and of analytical redundancy (estimation) thus offers multiple possibilities in the architecture of failure detection and isolation systems.

During the estimation of the speed of the aircraft relative to the surrounding air by inertia/static pressure fusion described in the present patent application, the group of sensors A is as follows:

inertial sensor
geographical vertical speed sensor
static pressure probe
air temperature probe The inertial sensor is typically an IRS (the acronym standing for "Inertial reference system") or an AHRS (the acronym standing for "Attitude and heading reference system") and provides the following measurements: three acceleration components (AccX, AccY, AccZ), three rotation speed components (p, q, r), two angles of roll and pitch. The gravity g at the current point is also known, via an appropriate gravity model.

The measurement of geographical vertical speed (vertical speed of the aeroplane relative to the Earth) typically arises from a GPS receiver, or from any radio or optical system making it possible to measure the geographical altitude relative to the Earth. It can also be obtained on the basis of the inertial measurements, on condition that the fact that the inertial vertical speed is divergent is taken into account. In all cases this measurement of geographical vertical speed must be independent of the corrected static pressure SSEC.

The group of sensors B comprises the anemometric sensors measuring the three components of the speed vector (Vair (TAS, AOA, SSA)).

For certain applications, the group of sensors B can be reduced to two or one of the three components of the speed vector.

For example: only the sensors measuring the speed of the aircraft relative to the surrounding air TAS and the angle of attack of the aircraft AOA are in group B since the topology of the mounting of the probes on the aircraft creates a weak coupling between the static pressure and the angle of sideslip of the aircraft SSA. Thus the probe for measuring the angle of sideslip SSA does not intervene in the estimation, neither in A nor in B.

In another example, the sensors measuring the angle of attack of the aircraft AOA and the angle of sideslip of the aircraft SSA are assumed to be reliable and are in group A; only the source of the speed of the aircraft relative to the surrounding air TAS is in group B.

What is claimed is:

1. Method of estimation of the speed of an aircraft relative to the surrounding air, in a reference frame tied to the aircraft, comprising:

estimating an estimated static pressure (PSe) on the basis of measurements of the geographical vertical speed (Vzgeo) of the aircraft, of measurements of the temperature (Tair) of the surrounding air, of reinitializations of the estimated static pressure (PSe), and of a feedback of the said estimated static pressure (PSe), by integration over a vertical path of a hydrostatic equation;

estimating a first intermediate variation (δTASa) of the speed of the aircraft relative to the surrounding air on the basis:

of a deviation between a variation (δPSe) of an estimated static pressure (PSe) and a variation (δPSm) of a measured static pressure (PSm);

of an angle of attack of the aircraft (AOA), and of an angle of sideslip of the aircraft (SSA);

of a linear combination of a variation (δTAS) of the speed of the aircraft relative to the surrounding air, of a variation (δAOA) of the angle of attack of the aircraft, and of a variation (δSSA) of the angle of sideslip of the aircraft, whose coefficients depend on laws of local aerodynamic correction (SSEC) dependent on the aircraft, on the speed (TASe) of the aircraft relative to the surrounding air, on the angle of attack of the aircraft (AOA), and on the angle of sideslip of the aircraft (SSA); and performing temporal integration of the said first intermediate variation (δTASa) of the speed of the aircraft relative to the surrounding air using reinitializations of the estimated speed of the aircraft relative to the surrounding air so as to deliver at output an estimated speed (TASe) of the aircraft relative to the surrounding air.

2. Method according to claim 1, in which the said reinitializations of the estimated speed (TASe) of the aircraft relative to the surrounding air use measurements of the speed of the aircraft relative to the surrounding air that are corrected by the laws of local aerodynamic correction (SSEC).

3. Method according to claim 1, in which the said reinitializations of the estimated static pressure (PSe) of estimating the estimated static pressure use measurements of the static pressure that are corrected by the laws of local aerodynamic correction (SSEC).

4. Method according to claim 3, in which the said reinitializations of the estimated speed (TASe) of the aircraft relative to the surrounding air use measurements of the speed of the aircraft relative to the surrounding air that are corrected by the laws of local aerodynamic correction (SSEC).

5. Method according to claim 1 comprising, furthermore:

estimating a second intermediate variation (δTASb) of the speed of the aircraft relative to the surrounding air on the basis of inertial measurements and of a feedback of the estimated speed (TASe) of the aircraft relative to the surrounding air at output, by likening the speed vector of the aircraft relative to the surrounding air to a speed vector of the aircraft relative to an inertial reference frame obtained by integration of the components of a measured acceleration vector (Inertial measurements), corrected for the kinematic effect of the reference frame tied to the aircraft and increased by the gravity projected into the reference frame tied to the aircraft, and consisting in estimating a second indicator of quality of the said second intermediate variation of the speed of the aircraft relative to the surrounding air; and performing a fusion of the said second intermediate variation (δTASb) of the speed of the aircraft relative to the surrounding air with the said first intermediate variation (δTASa) of the speed of the aircraft relative to the surrounding air by filtering of barycentre type weighted by the said first and second indicators of quality (IndQa, IndQb) or by a filtering of Kalman type, and of fusion of the said first and second indicators of quality (IndQa, IndQb) into a fused indicator of quality (IndQ) on the basis of the error variance estimated by the said filtering.

6. Method according to claim 5, in which the said reinitializations of the estimated speed (TASe) of the aircraft relative to the surrounding air use measurements of the speed of the aircraft relative to the surrounding air that are corrected by the laws of local aerodynamic correction (SSEC).

7. Method according to claim 5, in which the said reinitializations of the estimated static pressure (PSe) of estimating the estimated static pressure use measurements of the static pressure that are corrected by the laws of local aerodynamic correction (SSEC).

8. Method according to claim 7, in which the said reinitializations of the estimated speed (TASe) of the aircraft relative to the surrounding air use measurements of the speed of the aircraft relative to the surrounding air that are corrected by the laws of local aerodynamic correction (SSEC).

9. Method according to claim 1, in which estimating a first intermediate variation also estimates a first indicator of quality (IndQa) of the said first intermediate variation (δTASa) of the speed of the aircraft relative to the surrounding air dependent on the said coefficients of the said linear combination.

10. Method according to claim 9, in which the said reinitializations of the estimated speed (TASe) of the aircraft relative to the surrounding air use measurements of the speed of the aircraft relative to the surrounding air that are corrected by the laws of local aerodynamic correction (SSEC).

11. Method according to claim 9, in which the said reinitializations of the estimated static pressure (PSe) of estimating the estimated static pressure use measurements of the static pressure that are corrected by the laws of local aerodynamic correction (SSEC).

12. Method according to claim 11, in which the said reinitializations of the estimated speed (TASe) of the aircraft relative to the surrounding air use measurements of the speed of the aircraft relative to the surrounding air that are corrected by the laws of local aerodynamic correction (SSEC).

13. Method according to claim 9, comprising, furthermore:

estimating a second intermediate variation (δTASb) of the speed of the aircraft relative to the surrounding air on the basis of inertial measurements and of a feedback of the estimated speed (TASe) of the aircraft relative to the surrounding air at output, by likening the speed vector of the aircraft relative to the surrounding air to a speed vector of the aircraft relative to an inertial reference frame obtained by integration of the components of a measured acceleration vector (Inertial measurements), corrected for the kinematic effect of the reference frame tied to the aircraft and increased by the gravity projected into the reference frame tied to the aircraft, and consisting in estimating a second indicator of quality of the said second intermediate variation of the speed of the aircraft relative to the surrounding air; and performing a fusion of the said second intermediate variation ($\delta$TASb) of the speed of the aircraft relative to the surrounding air with the said first intermediate variation ($\delta$TASa) of the speed of the aircraft relative to the surrounding air by filtering of barycentre type weighted by the said first and second indicators of quality (IndQa, IndQb) or by a filtering of Kalman type, and of fusion of the said first and second indicators of quality (IndQa, IndQb) into a fused indicator of quality (IndQ) on the basis of the error variance estimated by the said filtering.

14. Method according to claim 13, in which the said reinitializations of the estimated speed (TASe) of the aircraft relative to the surrounding air use measurements of the speed of the aircraft relative to the surrounding air that are corrected by the laws of local aerodynamic correction (SSEC).

15. Method according to claim 13, in which the said reinitializations of the estimated static pressure (PSe) of estimating the estimated static pressure use measurements of the static pressure that are corrected by the laws of local aerodynamic correction (SSEC).

16. Method according to claim 15, in which the said reinitializations of the estimated speed (TASe) of the aircraft relative to the surrounding air use measurements of the speed of the aircraft relative to the surrounding air that are corrected by the laws of local aerodynamic correction (SSEC).

17. A device for estimating the speed of an aircraft relative to the surrounding air, in a reference frame tied to the aircraft, the device having a processor adapted for executing instructions that, when executed, cause the processor to:

estimate an estimated static pressure (PSe) on the basis of measurements of the geographical vertical speed (Vzgeo) of the aircraft, of measurements of the temperature (Tair) of the surrounding air, of reinitializations of the estimated static pressure (PSe), and of a feedback of the said estimated static pressure (PSe), by integration over a vertical path of a hydrostatic equation;

estimate a first intermediate variation ($\delta$TASa) of the speed of the aircraft relative to the surrounding air on the basis:

of a deviation between a variation ($\delta$PSe) of an estimated static pressure (PSe) and a variation ($\delta$PSm) of a measured static pressure (PSm);

of an angle of attack of the aircraft (AOA), and of an angle of sideslip of the aircraft (SSA);

of a linear combination of a variation ($\delta$TAS) of the speed of the aircraft relative to the surrounding air, of a variation ($\delta$AOA) of the angle of attack of the aircraft, and of a variation ($\delta$SSA) of the angle of sideslip of the aircraft, whose coefficients depend on laws of local aerodynamic correction (SSEC) dependent on the aircraft, on the speed (TASe) of the aircraft relative to the surrounding air, on the angle of attack of the aircraft (AOA), and on the angle of sideslip of the aircraft (SSA); and perform a temporal integration of the said first intermediate variation ($\delta$TASa) of the speed of the aircraft relative to the surrounding air using reinitializations of the estimated speed of the aircraft relative to the surrounding air so as to deliver at output an estimated speed (TASe) of the aircraft relative to the surrounding air.

18. Aircraft comprising the device according to claim 17.

* * * * *